Figure 1:
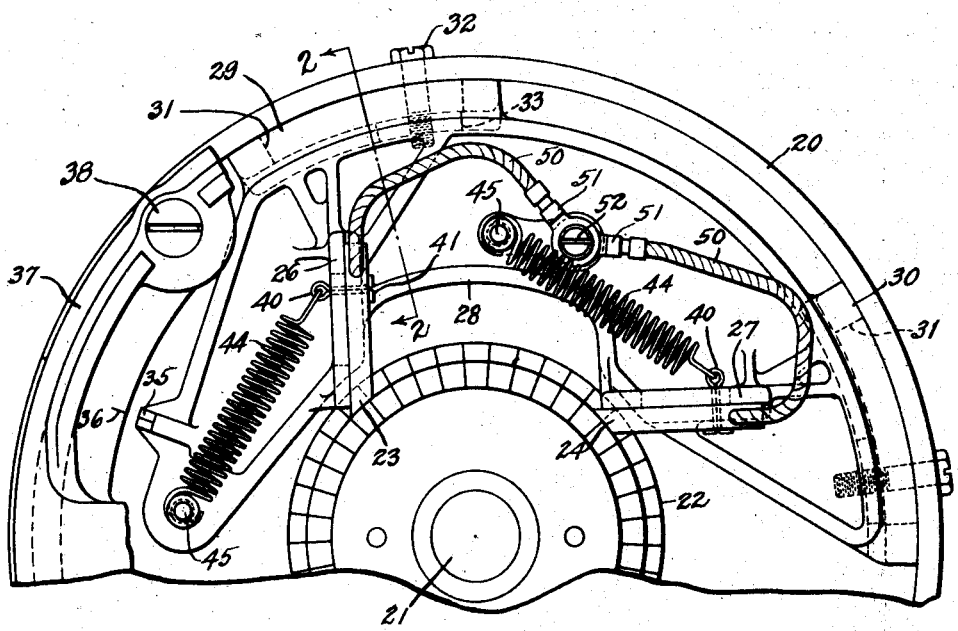

July 5, 1927.

J. G. CAMPBELL

DYNAMO

Filed Oct. 14, 1925

1,634,770

Inventor
John G. Campbell
By Spencer Sewall & Hardman
his Attorneys

Patented July 5, 1927.

1,634,770

UNITED STATES PATENT OFFICE.

JOHN G. CAMPBELL, OF DAYTON, OHIO, ASSIGNOR, BY MESNE ASSIGNMENTS, TO DELCO-REMY CORPORATION, OF DAYTON, OHIO, A CORPORATION OF DELAWARE.

DYNAMO.

Application filed October 14, 1925. Serial No. 62,488.

This invention relates to brushes and brush rigging for dynamo electric machines, and one of the objects of the invention is to provide at low cost a simple and durable brush rigging which will minimize the noise resulting from the engagement of the brushes with the commutator.

A further object is to provide a brush rigging which is initially adjusted to give quiet operation and which will remain in proper adjustment as the brush shortens due to wear, without further manipulation.

Further objects and advantages of the present invention will be apparent from the following description, reference being had to the accompanying drawings, wherein a preferred form of embodiment of the present invention is clearly shown.

Figure 2:
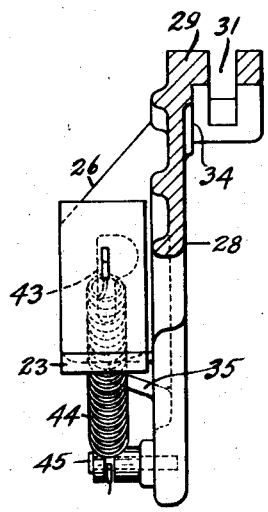

In the drawings:

Fig. 1 is a fragmentary end view of the dynamo electric machine having a form of brush rigging embodying the present invention; and Fig. 2 is a sectional view of the brush holder on the line 2—2 of Fig. 1.

Referring to the drawings, 20 designates the field frame of a dynamo electric machine, which supports for rotation a shaft 21 carrying a commutator 22 which is engaged by brushes 23 and 24 located substantially at 90°. The brushes 23 and 24 are supported by rigid pads 26 and 27, respectively, formed integral with a rigid brush bracket 28. Bracket 28 is provided with mounting pads 29 and 30 having cylindrical surfaces for engaging the inner cylindrical surface of the field frame 20. The pads 29 and 30 are each provided with a slot 31 for receiving a screw 32 which passes through a plain hole in the frame 20 through the slot 31 and receives a nut 33 having a flat side which engages the surface 34 of the bracket adjacent the slot 31, as shown in Fig. 2. This surface 34 prevents the nut 33 from turning when the bolt 32 is turned. It is, therefore, apparent that the bracket 28 may be adjusted angularly with respect to the commutator 22. The bracket 28 is provided with a pointer 35 which may cooperate with an index mark 36 on the field frame or on the field-frame end cover 37 which is attached to the field frame by a screw 38.

Each of the brushes 23 is provided with a hole which receives a cotter pin 40 the prongs 41 of which are spread against the brush. The shank of pin 40 extends through an opening 43 in the pad 26 or 27, and the eye of the pin 40 receives one end of a spring 44 which is attached at its other end to a stud 45 carried by the bracket 28. The opening 43 is widened at one end so that the spring 44 may pass through it, thereby permitting the brush, cotter pin and spring to be assembled before the brush is mounted on the bracket and the spring is attached to the stud 45. As the brush wears away, the pin 40 moves near the commutator and hence into the narrower part of the opening 43, the sides of which limit sidewise movement of the pin 40 hence, of the brush.

Where the invention is applied to a repulsion induction motor, the pigtails 50, attached to the brushes, are electrically connected by attaching the pigtail clips 51 to the bracket 28 by screws 52.

The opening in the brush for receiving the pin 40 is located at a substantial distance from the outer end of the brush, so that, although the brush is new, the spring 44 will cause substantially the entire side surface of the brush to bear firmly against the supporting pad. The spring is located relative to the brush so that it exerts a pull on the brush causing the brush to bear sufficiently against the commutator, and to bear against the pad with pressure sufficient to prevent brush noise while allowing sufficient freedom of movement of the brush to allow the brush operatively to engage the commutator. In order that the brush will not become noisy during its life, it should bear with the same total pressure against the pad as the brush shortens due to wear. The present invention provides for this condition automatically as the brush wears away.

As the brush wears down the spring will shorten slightly, so that the pressure of brush upon the commutator will decrease. The spring is relatively long so that shortening thereof due to the shortening of the brush will not cause the spring tension to be reduced to the point where the brush will not engage the commutator with the contact pressure desired. While the brush pressure against the commutator is decreasing, the brush pressure against the pad is decreasing but to a very much less degree. This is due to the increase in angularity of the spring relative to the brush pad as the brush shortens. Although the resultant or total spring force decreases, the component of that force which causes the brush to press against the brush pad is increasing in its relative value with respect to the component of spring force causing the brush to bear against the commutator. Thus there is but little diminution of pressure of the brush against the pad as the brush wears away.

This arrangement of the brush spring and brush pad permits the use of a spring which can be made initially to provide the correct tension throughout the life of the brush, so that the brush rigging will require no adjustment on account of brush wear. In other words, the spring is constructed to cause the brush to bear with pressure upon the commutator sufficient to provide a good electric contact and to cause the brush to bear with substantially the correct pressure against the pad at all times during the life of the brush. In this way the invention eliminates the cost of providing a brush spring adjusting device, and the uncertainty of maintaining a correct spring adjustment during the use of the machine.

While the form of embodiment of the invention as herein disclosed, constitutes a preferred form, it is to be understood that other forms might be adopted, all coming within the scope of the claims which follow.

What is claimed is as follows:

1. A dynamo brush-rigging comprising, in combination, a brush for engaging the dynamo commutator, a support substantially coextensive with one side of the brush, and a single spring connected with the brush for urging the brush against the commutator and support, the spring being so constructed and arranged that the pressure of the brush against the support remains substantially unchanged during the life of the brush.

2. A dynamo brush-rigging comprising, in combination, a brush for engaging the dynamo commutator, a support substantially coextensive with one side of the brush, and a single coiled spring connected with the brush for urging the brush against the commutator and support, the spring being of such length, when the brush is new, and angularly disposed relative to the support, that the pressure of the brush against the support remains substantially unchanged during the life of the brush.

3. A dynamo brush-rigging comprising, in combination, a brush for engaging the dynamo commutator, a support substantially coextensive with one side of the brush, and a single relatively long coiled spring connected with the brush for urging the brush against the commutator and support, the spring being inclined relative to the brush support toward the commutator so that the pressure of the brush against the support remains substantially unchanged during the life of the brush.

4. A dynamo brush-rigging comprising, in combination, a brush for engaging the dynamo commutator, a rigid brush pad substantially coextensive with one side only of the brush and provided with an opening, and a single coiled spring connected with the brush through said opening and inclined from the pad toward the commutator.

In testimony whereof I hereto affix my signature.

JOHN G. CAMPBELL.